United States Patent [19]

Lula et al.

[11] 4,447,565

[45] May 8, 1984

[54] METHOD AND COMPOSITION FOR MOLDING LOW DENSITY DESICCANT SYNTACTIC FOAM ARTICLES

[75] Inventors: James W. Lula, Bonner Springs, Kans.; James R. Schicker, Lee's Summit, Mo.

[73] Assignee: The United States of America as represented by the United States Department of Energy, Washington, D.C.

[21] Appl. No.: 328,327

[22] Filed: Dec. 7, 1981

[51] Int. Cl.³ ............................................. C08J 9/32
[52] U.S. Cl. ................................... 523/219; 264/109; 264/299; 264/DIG. 6; 428/304.4; 428/313.9; 521/54; 521/181; 521/189; 523/218
[58] Field of Search ..................... 521/54, 189, 181; 523/219, 218; 264/DIG. 6, 109, 299; 428/304.4, 313.9

[56] References Cited

U.S. PATENT DOCUMENTS

| | | | |
|---|---|---|---|
| 3,230,184 | 1/1966 | Alford | 523/219 |
| 3,545,622 | 12/1970 | Sakhnovsky et al. | 210/496 |
| 3,704,806 | 12/1972 | Plochenov et al. | 524/789 |
| 3,786,004 | 1/1974 | Furuya et al. | 521/85 |
| 3,855,160 | 12/1974 | Shiotsu et al. | 521/70 |
| 3,873,475 | 3/1975 | Pechacek et al. | 521/54 |
| 3,928,254 | 12/1975 | Takayama et al. | 521/54 |
| 3,960,583 | 6/1976 | Netting et al. | 521/54 |
| 4,077,922 | 3/1978 | Farrissey, Jr. et al. | 523/219 |
| 4,085,937 | 4/1978 | Schenk | 523/219 |

OTHER PUBLICATIONS

"Chemically Loaded Sieves", Union Carbide, Jul. 1, 1959, pp. 1-6.

Primary Examiner—Morton Foelak
Attorney, Agent, or Firm—Armand McMillan; Albert Sopp; Michael F. Esposito

[57] ABSTRACT

A method and a composition are provided for molding low density desiccant syntactic foam articles. A low density molded desiccant article may be made as a syntactic foam by blending a thermosetting resin, microspheres and molecular sieve desiccant powder, molding and curing. Such articles have densities of 0.2-0.9 g/cc, moisture capacities of 1-12% by weight, and can serve as light weight structural supports.

14 Claims, 2 Drawing Figures

METHOD AND COMPOSITION FOR MOLDING LOW DENSITY DESICCANT SYNTACTIC FOAM ARTICLES

The U.S. Government has rights in this invention pursuant to Contract No. DE-AC04-76DP00613 between the U.S. Department of Energy and Bendix Corporation.

BACKGROUND OF THE INVENTION

The present invention relates to a method and a composition for molding to size low density desiccant syntactic foam articles, and the articles produced thereby.

It is known that molded desiccant articles may be made from various desiccant materials in combination with binders. Prior art articles of this type include molded blocks comprising a desiccant and an epoxy resin, as disclosed in, e.g., U.S. Pat. No. 3,545,622. Such articles generally have a density of about 1 g/cc, and compressive strengths of about 8,000 psi. Higher density structural desiccants are reported made from molecular sieve, glass frit and bentonite, as reported in, e.g., U.S. Pat. No. 3,235,089.

Others have made materials having flexibility and high tensile strengths, as disclosed in, e.g., U.S. Pat. Nos. 4,036,360, 4,239,516 and 3,704,806. However, none of these references disclose a low density syntactic foam article nor a method for molding such an article to size.

OBJECTS OF THE INVENTION

One object of the present invention is to provide a method for molding to size low density desiccant syntactic foam articles with substantially no shrinkage and without excessively high molding pressures.

Another object of the invention is to provide low density molded desiccant articles which, in addition to adsorbing moisture, are strong enough to serve as a structural support yet light enough to be used in applications where excess weight is detrimental.

A further object of the present invention is to provide low density molded desiccant articles which are sufficiently stable to heat to permit repeated activation without degradation.

Yet another object of the invention is to provide a powdered composition which is stable indefinitely and which can be molded in a relatively short time and by simpler procedures than those used to manufacture the higher density molded desiccants currently in use.

Upon further study of the specification and appended claims, further objects and advantages of this invention will become apparent to those skilled in the art.

SUMMARY OF THE INVENTION

These and other objects of the invention are achieved by a process for molding to size a desiccant syntactic foam article having a density of 0.2–0.9 g/cc and a moisture capacity of 1–12% by weight, comprising the steps of:

(a) charging a mold with a powdery mixture of an activated desiccant, microspheres and a thermosetting resin, the amount of the desiccant being sufficient to provide the required moisture capacity, and the amounts of the microspheres and resin being such that the microspheres/desiccant volume fraction exceeds the packing factor by an amount sufficient to substantially avoid shrinkage without causing excessively high molding pressures;

(b) covering the mold and heating the covered mold to a temperature and for an amount of time sufficient to melt the resin; and (c) tightly closing the mold and heating the closed mold to a temperature and for an amount of time sufficient to cure the resin, and removing the resultant desiccant syntactic foam article from the mold.

In a composition of matter aspect, the present invention provides desiccant syntactic foam articles, and a composition of matter for use in molding the same.

DETAILED DISCUSSION

Figure 1:
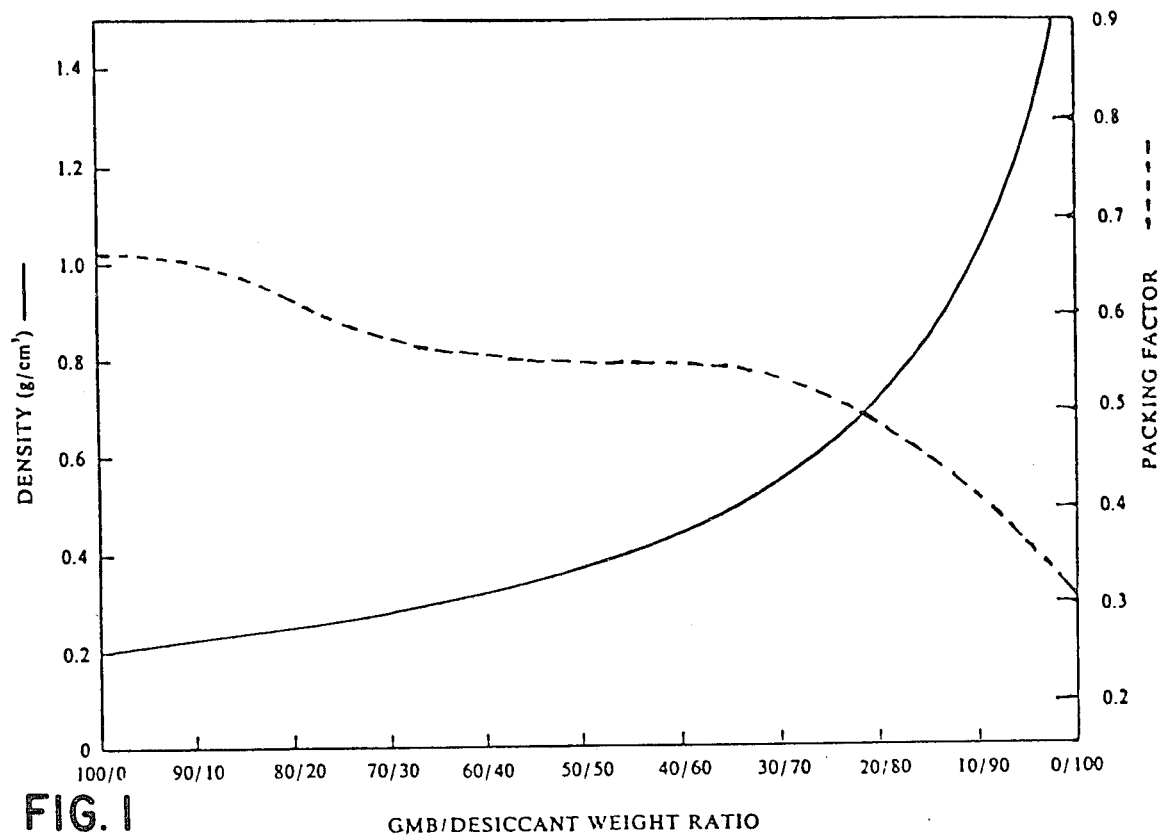
FIG. 1 is a plot of the density and the packing factor of a mixture of glass microbubbles and desiccant as a function of the weight ratio.

The desiccant used in the present process is a powdered solid having a substantial capacity for moisture adsorption. Preferably, molecular sieve is used having a nominal pore size sufficiently large to admit water molecules. Molecular sieves are crystalline metal aluminosilicates, as disclosed, e.g., in U.S. Pat. No. 2,882,243, which is incorporated herein by reference. Any molecular sieve may be used that retains moisture, e.g., Types 3 A, 4 A, 5 A and 13X.

Type 3 A will be discussed hereinafter for illustrative purposes. It is a potassium alumino-silicate crystal. "Type 3 A" refers to the nominal pore size of 3 Angstroms (0.3 nm), which admits molecules such as water, ammonia and methanol having effective diameters of 3 Å or less, while excluding molecules with larger effective diameters such as nitrogen. Typical properties of Type 3 A powdered desiccant are shown in Table 1.

TABLE 1

| Typical Properties of Type 3A Powder Desiccant | |
|---|---|
| Property | Value |
| Nominal Pore Diameter (Å) | 3.0 |
| Density (g/cm$^3$) | |
| Hydrate Wet | 2.03 |
| Activated Dry | 1.57 |
| Particle Diameter ($\mu$m) | 10.0 |
| Weight (Percent)* | |
| Equilibrium H$_2$O Capacity | 23 |
| Water Content (as Shipped) | <2.5 |

*Grams H$_2$O/100 grams activated desiccant at 17.5 mm Hg and 25° C.

It will be seen that Type 3 A molecular sieve has an effective moisture adsorbing capacity (Cm) of about 20.5%, which represents the equilibrium water capacity minus the water content of the activated desiccant, as shipped. This is typical of activated molecular sieves, which normally have effective moisture capacities of about 20–23% by weight. Other desiccants having equivalent properties may also be used in the present process.

The microspheres used to prepare the low density desiccant syntactic foam articles of the invention may be glass microbubbles (GMB), ceramic microballoons, carbon microspheres or other chemically stable, water resistant and non-porous hollow spheres having a low density. Commercially available microspheres normally have bulk densities of about 0.16–0.4 g/cc. They are often floated to eliminate broken microbubbles and/or surface treated, which may enhance resin adhesion and prevent the balloons from caking during storage.

A preferred type of microspheres is thin walled, hollow glass microbubbles having diameters of about 10-150 μm, e.g., those produced by the 3M Company. These GMB may be purchased in densities ranging from about 0.16-0.38 g/cc. As an illustration, 3M A20/1000 GMB will be exemplified in the discussion which follows, although this is not limitative of the invention. Its nominal density is 0.20 g/cc, and it has a nominal crush strength of 6900 kPa.

A mixture of the microspheres, e.g., the GMB, and the desiccant, e.g., Type 3 A molecular sieve, comprises the filler used to prepare the syntactic foam of the invention. A third component is a thermosetting resin which, when cured, binds the desiccant and microsphere particles to form a rigid foam having a relatively high void volume. The resin occupies a very small volume in the syntactic foam and the void volume can range up to about 40%.

Because the filler itself has a low density, this permits production of a desiccant syntactic foam article which has a density of 0.2-0.9 g/cc and a moisture capacity of 1-12% by weight, preferably 1.5-12%. It will be understood that higher moisture capacity implies higher minimum density, so that 12% moisture capacity can be achieved with a minimum density of about 0.5 g/cc. The desiccant content of the articles will thus be 4.35-60% by weight. These articles nevertheless have compressive strengths of at least about 750 psi, and usually at least about 1000 psi. They are strong enough to serve as a structural support despite their light weight.

The thermosetting resin used in the present process for producing the low density syntactic foam articles of the invention should be stable at room temperature. It is advantageous to use a resin which cures by a process which does not evolve a volatile by-product to avoid bubble formation during cure.

Suitable such resins include polyimide resins, polybenzimidazole resins, e.g., Imidite X386 (Whittaker), polyphenylene resins, e.g., H-resin (Hercules), phenolic resins, e.g., Plyothen 24-655 (Reichhold), and the like.

The cured resin preferably is stable at temperatures of about 230°-300° C., the temperature at which molecular sieves are reactivated. It will be noted that most epoxy resins do not tolerate prolonged or repeated treatment at these temperatures.

It is also convenient to use a resin which melts at a temperature sufficiently below the cure temperature that the mold may be closed tightly before cure begins to any substantial extent. Otherwise, more careful timing is necessary during molding.

Preferred resins are polyimide resins, especially those that cure by an addition reaction and without outgassing. Illustrative of such polyimide resins is Kerimid 601, made by Rhone Poulenc, a fully imidized powder of the type disclosed in U.S. Pat. No. 3,562,223. The present process will be exemplified with the use of this resin, although other thermosetting resins may also be used.

Molding a low density syntactic foam to size requires that the packing factor of the filler component be known. The packing factor represents the maximum volume fraction the filler will occupy within the finished article, and is the ratio of the tap density to the true density. If the packing factor is exceeded, the mold will be difficult to close. If GMB is the filler and the packing factor is exceeded, some GMB will be broken.

The filler component for a low density syntactic foam desiccant is the microspheres/desiccant combination, e.g., GMB/Type 3 A molecular sieve desiccant. It is advantageous to plot a curve of the packing factor for various microsphere/desiccant combinations, by blending different weight ratios of microspheres and desiccant and then measuring tap density and true density. The tap density, true density and packing factor are measured according to ASTM D3101.

The packing factor generally does not vary linearly with the change in weight ratio. FIG. 1 shows the packing factor for various combinations of GMB/desiccant, where the GMB is 3M A20/1000 GMB and the desiccant is Type 3 A molecular sieve, with the properties shown in Table 1. FIG. 1 also shows a plot of the density of this filler as a function of the GMB/desiccant weight ratio.

Where a molded desiccant part is to be molded to size, the volume of the part, the desired density and the desired moisture adsorption capacity are generally specified. These parameters will determine the amount of desiccant required in the final article, and thus the amount of desiccant required in the formulation used to mold it to size. This amount is constant, regardless of the remaining constituents of the formulation.

To determine the weights of resin and microspheres in the formulation, an arbitrary microspheres/desiccant weight ratio is selected, the weight of microspheres is calculated from the known desiccant weight, and the resin weight is then the difference between the sum of the microspheres and desiccant weights and the total part weight, determined by the density and volume specifications.

For any specific formulation, the volume fraction of the microspheres/desiccant combination is calculated by dividing the combined volumes of microspheres and desiccant by the part volume. The combined volumes are calculated by dividing the combined weights by the density for the chosen weight ratio, e.g., as shown in FIG. 1. Given a constant dessicant weight and part volume, the microspheres/desiccant volume fraction will vary with the microspheres/desiccant weight ratio.

Figure 2:
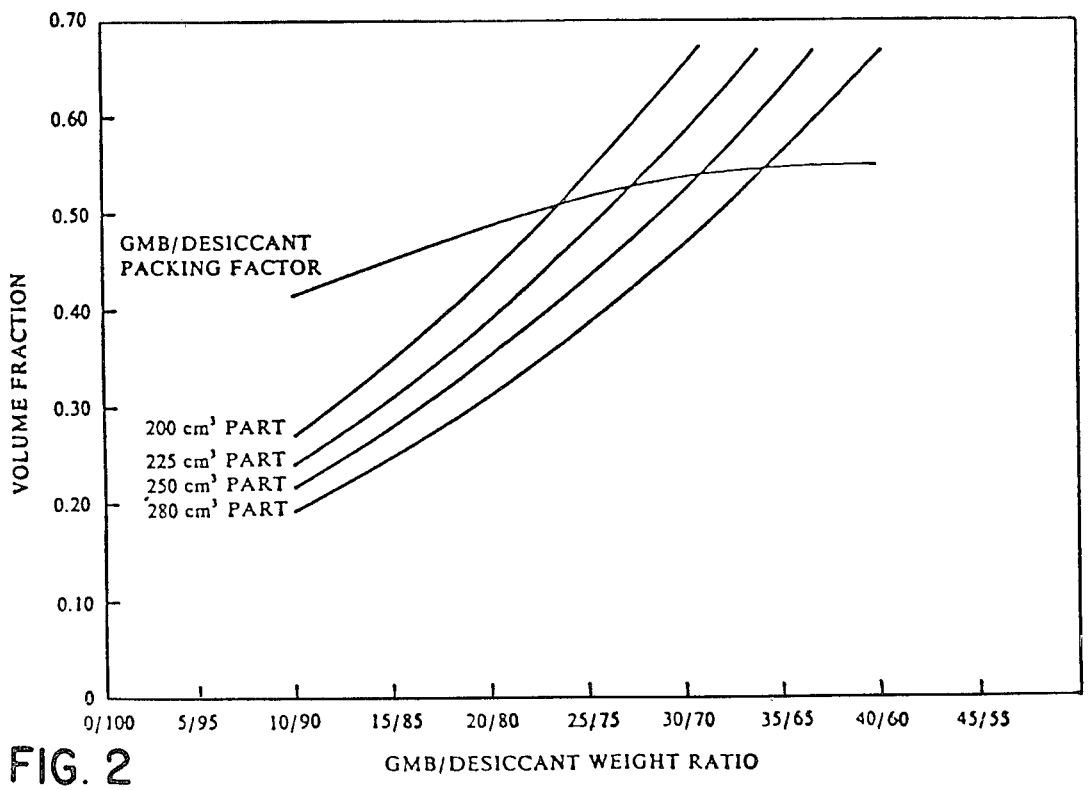
FIG. 2 is a plot of the volume fraction of three glass microbubble/desiccant mixtures as a function of the weight ratio, showing the intersection of those curves with the packing factor curve.

It is useful to plot the volume fraction, determined as described above, as a function of the microspheres/desiccant weight ratio. An illustration of such a plot is shown in FIG. 2. The appropriate portion of the packing factor curve of FIG. 1 is also shown in FIG. 2.

The intersection of these lines is significant and indicates where a specific formulation will exceed the microspheres/desiccant packing factor. Formulations with volume factor at or above the packing factor are used when an article is to be molded to size. Formulations below the packing factor will result in shrinkage to various degrees, depending upon the amount by which the formulation is lower than the packing factor.

Formulations for molding low density desiccant syntactic foam articles to size are advantageously based on microspheres/desiccant volume fractions of up to about 25% higher than the packing factor, preferably about 5-15% more than the packing factor. This value results in articles that have a small number of broken microspheres, which are normally not detrimental to the function of the part, and does not cause excessively high molding pressures. A different value for the amount by which the volume fraction exceeds the packing factor may be appropriate for other types of formulations, and the illustrated value of 5% should not be considered limitative, but merely an empirical guideline for GMB/Type 3 A molecular sieve fillers.

The three components of a typical molding formulation are blended to achieve a homogeneous mixture, e.g., in a V-shell blender. The mixture should be stored in a moisture-free environment such as dry nitrogen until ready for use. It will be noted that this type of formulation can be stored in a dry atmosphere at room temperature for an indefinite period of time, in contrast to liquid epoxy/desiccant powder mixtures used to prepare prior art desiccant articles, which must be used within 48 hours.

A mold is charged with the formulation, and it is necessary to spread the charge evenly to prevent lower density areas which will crack. The material will now flow to compensate for uneven material loading. When the charge is evenly distributed, the top of the mold is gently set in place and the entire mold is placed in a preheated oven at a temperature slightly above the melting point of the thermosetting resin. The resin melts and coats the low density filler, which remains solid.

After the resin melts, the mold is tightly closed and placed in an oven set at the cure temperature, for a time sufficient to cure the thermosetting resin. After this time, the mold is removed from the oven and disassembled. It is advantageous to remove the molded article from the mold while both are hot, since removal after the mold has cooled is more difficult because the mold contracts more than the part.

The times and temperatures at which melting and curing of the resin are effected will vary for different resins, and these are adjusted as needed.

After completion of cure and demolding of the article, it is advantageous to effect an additional activation of the syntactic foam article under standard conditions to insure consistent quality.

Low density desiccant syntactic foam articles molded to size according to the invention may be machined, if necessary, but the article can be molded to size with a minimum of machining. In contrast, prior art desiccant articles molded from a desiccant and a liquid epoxy resin must have the outer surfaces machined off, since the liquid resin migrates to the surface during cure. Furthermore, this type of article requires long curing times, on the order of 30 hours, while the cure time for, e.g., polyimide resin, which is a preferred component of the present formulation, is short, on the order of 3 hours.

The molded articles produced by the present process are characterized by low density, i.e., 0.2–0.9 g/cc, and by a moisture capacity of 1–12% by weight. Furthermore, these articles have a sufficiently high compressive strength so that they are strong enough to serve as structural supports even though they are light enough to be used in applications where excess weight is detrimental. For example, a typical molded article according to the present invention will have a compressive strength of at least about 750 psi, preferably at least about 1000 psi, and routinely about 1700 psi. Articles according to the invention are rigid enough to withstand machining operations. In addition, where a polyimide resin is used, or another resin which is also stable to at least 300° C., the desiccant article may be repeatedly activated without substantial degradation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

These examples illustrate the molding of syntactic foam articles using the formulation containing Type 3 A molecular sieve desiccant powder having the properties shown in Table 1, 3M A20/1000 GMB and Rhone Poulenc Kerimid 601 polyimide resin.

In the following examples, all temperatures are set forth uncorrected in degrees Celsius; unless otherwise indicated, all parts and percentages are by weight.

EXAMPLE 1

A molded part was required having a moisture capacity of 10 g, a volume of 280 cc and a maximum density of 0.5 g/cc. This corresponds to a moisture capacity of at least 7.14% by weight. Given an effective moisture capacity for the desiccant of 20.5% by weight (23.0%–2.5% water content as shipped), the amount of desiccant required is 10 g/0.205=48.8 g. This amount of desiccant is constant, regardless of the formulation.

For various GMB/desiccant weight ratios, the tap density, true density and packing factor are measured and plotted, and the density of these filler combinations is also plotted, as shown in FIG. 1. The volume fraction is then calculated for the particular part volume, and plotted against a convenient range of GMB/desiccant weight ratios.

TABLE 2

GMB/Desiccant Volume Fraction for Various Weight Ratios

| GMB/Desiccant Weight Ratio | Density (g/cm³) | Volume Fraction | Weight (g) Resin | Weight (g) GMB |
|---|---|---|---|---|
| 10/90 | 1.013 | 0.191 | 84.378 | 5.422 |
| 15/85 | 0.835 | 0.246 | 81.188 | 8.612 |
| 20/80 | 0.704 | 0.309 | 77.600 | 12.200 |
| 25/75 | 0.610 | 0.381 | 73.533 | 16.267 |
| 30/70 | 0.542 | 0.459 | 68.886 | 20.914 |
| 35/65 | 0.485 | 0.553 | 63.523 | 26.277 |
| 36.25/63.75 | 0.475 | 0.576 | 62.051 | 27.749 |
| 40/60 | 0.441 | 0.659 | 57.267 | 32.533 |
| 45/55 | 0.400 | 0.792 | 49.873 | 39.927 |

Part volume is 280 33; part density is 0.495 g/cm³; and activated desiccant is 48.8 g.

Table 2 shows a selection of formulations based on GMB/desiccant weight ratios of 10/90 through 45/55 for a 280 cc part with a density of 0.495 g/cc, and containing 48.8 g of desiccant. The GMB/desiccant density is determined from FIG. 1, and the weights and GMB/desiccant volume fraction are calculated as previously described. The volume fraction from Table 2 is plotted against the GMB/desiccant weight ratio in FIG. 2. For comparison, the volume fraction is also calculated and plotted for other part volumes. Also, the GMB/desiccant packing factor from FIG. 1 for the selected range of weight ratios is plotted again in FIG. 2.

As noted above, the intersection of the volume fraction curve and the packing factor curve indicates where a specific formulation will exceed the GMB/desiccant packing factor. Formulations below the packing factor will shrink, while formulations at or above the packing factor will not shrink, but the molds will be increasingly difficult to close.

This was verified by molding test blocks (127×127×25.4 mm) using GMB/desiccant weight ratios of 5/95 through 35/65, and formulations based on the density of 0.495 g/cc, 48.8 g desiccant, and 225 cc part volume, using the curve for a 225 cc part plotted in FIG. 2. A description of the test blocks is given in Table 3. Each test block with GMB/desiccant weight ratios of 5/95 through 25/75 experienced various degrees of shrinkage. Those test blocks with weight ratios of 30/70 and 35/65 did not shrink, but the molds were increasingly more difficult to close.

TABLE 3

Shrinkage Evaluation

| GMB/Desiccant Weight Ratio | Mixing Weight* (g) Resin | Mixing Weight* (g) GMB | Mold Closing** | Shrinkage (Percent) |
|---|---|---|---|---|
| 5/95 | 119.3 | 5.1 | Very Easy | 32 |
| 10/90 | 113.6 | 10.8 | Very Easy | 22 |
| 15/85 | 107.2 | 17.2 | Very Easy | 9 |
| 20/80 | 100.0 | 24.4 | Easy | 7 |
| 25/75 | 91.9 | 32.5 | Easy | Slight |
| 30/70 | 82.6 | 41.8 | Slight Springback | None |
| 35/65 | 71.8 | 52.6 | Springback | None |

*Desiccant is 97.6 g.
**Charge weight is 203.0 g.

It should be noted that formulations for molding to size are sensitive to variations in the true density of the GMB. As purchased, the density of, e.g., 3M A20/1000 GMB may vary from 0.18 g/cc to 0.22 g/cc. If the formulation is calculated for a density of 0.20 g/cc, the nominal density for this GMB, an actual density of 0.18 g/cc will result in the volume fraction of GMB/desiccant exceeding the packing factor by an amount greater than the desired 5%. The mold will take excessive pressure to close, and a greater number of GMB will break. At the other extreme, using 0.22 g/cc GMB will result in a lower volume fraction, thus increasing the chances for cracks and shrinkage in the part.

Accordingly, it is advantageous to carefully determine the true density of the GMB used to prepare each specific formulation. It may be necessary to calculate the curves of density, packing factor and volume fraction for any new formulation if the density of the microspheres is different from earlier shipments, and the same is true if the desiccant properties vary.

A molded part was prepared capable of adsorbing 10 g of moisture, with a maximum part density of 0.50 g/cc (activated density), and a part volume of 280 cc. Using the method described above, a formulation was developed to meet these requirements, containing 46% by weight Kerimide 601, 18.8% by weight 3M A20/1000 GMB, and 35.2% by weight Type 3 A molecular sieve desiccant (activated), and using a mold charge weight of 138.6 g.

The three components were blended in a V-shell blender for 45 minutes, after which the mixture could be stored under dry nitrogen for as long as necessary. The mixture was charged evenly in a mold using a spatula, carefully tamped down, and the top of the mold was gently set in place. The entire mold was placed in a preheated oven at 120° C. After 1 hour the mold was closed with a press, the hold-down bolts were tightened, and the mold was placed in an oven at 200° C. for 2.5 hours.

The mold was removed from the oven, immediately disassembled, and the part removed while the mold was hot. The part was dimensionally correct, and surpassed the moisture capacity requirement.

EXAMPLE 2

A part having a moisture capacity of 15 g, a volume of 280 cc and a maximum density of 0.55 g/cc was prepared using the method of Example 1. This requires that the part contain 73.2 g of desiccant. Using the procedure of Example 1, formulations were calculated for the molded part, using various GMB/desiccant weight ratios. A selection of formations is shown in Table 4.

From the curve of volume fraction and packing factor, a formulation was selected for which the GMB/desiccant volume fraction exceeded the packing fraction by 5%, and having 39% by weight Kerimide 601, 13% by weight 3M A20/1000 GMB and 47.5% by weight Type 3 A molecular sieve desiccant, with a mold charge weight of 154.0 g.

Parts were molded, using the procedure of Example 1, with this formulation. They were dimensionally correct and surpassed the moisture capacity requirement, which in this case is 9.74% by weight.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

TABLE 4

Low Density Desiccant Formulation for Part Volume of 280 cm³, Part Density of 0.55 g/cm³, and Moisture Capacity of 15.0 g

| | GMB/Desiccant Weight Ratio | | | |
|---|---|---|---|---|
| | 30/70 | 29/71 | 25/75 | 20/80 |
| Weight* GMB (g) | 31.359 | 29.899 | 24.400 | 18.300 |
| Packing Factor | 0.533 | 0.529 | 0.515 | 0.485 |
| +5 Percent Volume** (cm³) | 0.560 | 0.555 | 0.541 | 0.509 |
| GMB/Desiccant | 156.800 | 155.526 | 151.410 | 142.590 |
| GMB | 111.050 | 109.776 | 105.660 | 96.840 |
| GMB Density | 0.282 | 0.272 | 0.231 | 0.189 |
| Weight Percent*** | | | | |
| Resin | 32.1 | 33.1 | 36.7 | 40.6 |
| GMB | 20.4 | 19.4 | 15.8 | 11.9 |

*Desiccant weight is 73.2 g.
**Desiccant volume is 45.750 cm³.
***Desiccant is 47.5 percent.

What is claimed is:

1. A process for molding to size a desiccant syntactic foam article having a density of 0.2-0.9 g/cc and a moisture capacity of 1-12% by weight, comprising the steps of:
   (a) charging a mold with a powdery mixture of an activated molecular sieve desiccant, microspheres and a thermosetting resin, the amount of the desiccant being sufficient to provide the required moisture capacity, and the amounts of the microspheres and resin being such that the microspheres/desiccant volume fraction exceeds the packing factor by an amount sufficient to substantially avoid shrinkage without causing excessively high molding pressures;
   (b) covering the mold and heating the covered mold to a temperature and for an amount of time sufficient to melt the resin; and (c) tightly closing the mold and heating the closed mold to a temperature and for an amount of time sufficient to cure the resin, and removing the resultant desiccant syntactic foam article from the mold.

2. The process of claim 1, wherein the microspheres are glass microbubbles.

3. The process of claim 2, wherein the glass microbubbles have diameters of 10–150 μm and a bulk density of 0.16–0.38 g/cc.

4. The process of claim 3, wherein the glass microbubbles have a bulk density of 0.18–0.22 g/cc.

5. The process of claim 1, wherein the thermosetting resin is a polybenzimidazole resin, a polyphenylene resin, a phenolic resin or a polyimide resin.

6. The process of claim 5, wherein the resin is a polyimide resin.

7. The process of claim 1, wherein the desiccant is Type 3 A molecular sieve having a nominal pore size of about 0.3 nm.

8. The process of claim 1, wherein the microspheres/desiccant volume fraction exceeds the packing factor by up to about 25%.

9. The process of claim 8, wherein the microspheres/desiccant volume fraction exceeds the packing factor by about 5–15%.

10. A desiccant syntactic foam article having a density of 0.2–0.9 g/cc and a moisture capacity of 1–12% by weight, produced by the process of claim 1.

11. The desiccant syntactic foam article of claim 10, having a compressive strength of at least about 750 psi.

12. A desiccant syntactic foam article of claim 11, wherein the compression strength is at least about 1000 psi.

13. A desiccant syntactic foam article according to claim 1, having a density of 0.2–0.9 g/cc, a moisture capacity of 1–12% by weight, and a compressive strength of at least about 750 psi, comprising a filler of molecular sieve desiccant and microspheres, and a cured thermoset resin binder.

14. The desiccant syntactic foam article of claim 13, wherein the compressive strength is at least 1000 psi.

* * * * *